United States Patent

Knauer

[15] 3,671,679

[45] June 20, 1972

[54] ARRANGEMENT FOR THE RECOGNITION OF LOOP CLOSURE IN SUBSCRIBER STATIONS HAVING SEMICONDUCTOR AMPLIFIERS FED VIA THE CONNECTING TRUNK

[72] Inventor: Hans Ulrich Knauer, Ludwigsburg, Germany

[73] Assignee: International Standard Electric Corporation, New York, N.Y.

[22] Filed: Nov. 18, 1969

[21] Appl. No.: 877,806

[30] Foreign Application Priority Data

Dec. 7, 1968 Germany ....................... P 18 13 347.6

[52] U.S. Cl. ............................................ 179/81 B, 179/16 A

[51] Int. Cl. .................................... H04m 3/40, H04m 19/00

[58] Field of Search .................. 179/16 E, 18 F, 18 FA, 81 B, 179/16 A

[56] References Cited

UNITED STATES PATENTS

| | | | |
|---|---|---|---|
| 3,046,353 | 7/1962 | Tschumi et al. | 179/81 B |
| 3,626,101 | 12/1971 | Fitzsimons et al. | 179/16 F |

FOREIGN PATENTS OR APPLICATIONS

| | | | |
|---|---|---|---|
| 284,064 | 6/1966 | Australia | 179/81 B |
| 345,671 | 11/1956 | Switzerland | 179/81 B |
| 1,131,754 | 6/1962 | Germany | 179/84 T |
| 1,462,245 | 11/1965 | Germany | 179/81 B |

*Primary Examiner*—William C. Cooper
*Assistant Examiner*—Randall P. Myers
*Attorney*—C. Cornell Remsen, Jr., Walter J. Baum, Percy P. Lantzy, J. Warren Whitesel, Delbert P. Warner and James B. Raden

[57] ABSTRACT

An arrangement is provided for the recognition of call initiating loop closure in telephone subscriber stations employing semi-conductor amplifiers fed over a connecting trunk. On loop-closure, there is first created a virtual short circuit in the supervisory current direction. After recognition, the exchange switches over to the feed current direction for the amplifiers in the subscriber station. In this way the loop closure criterion is made independent of the d-c resistance of the amplifiers.

6 Claims, 1 Drawing Figure

PATENTED JUN 20 1972
3,671,679
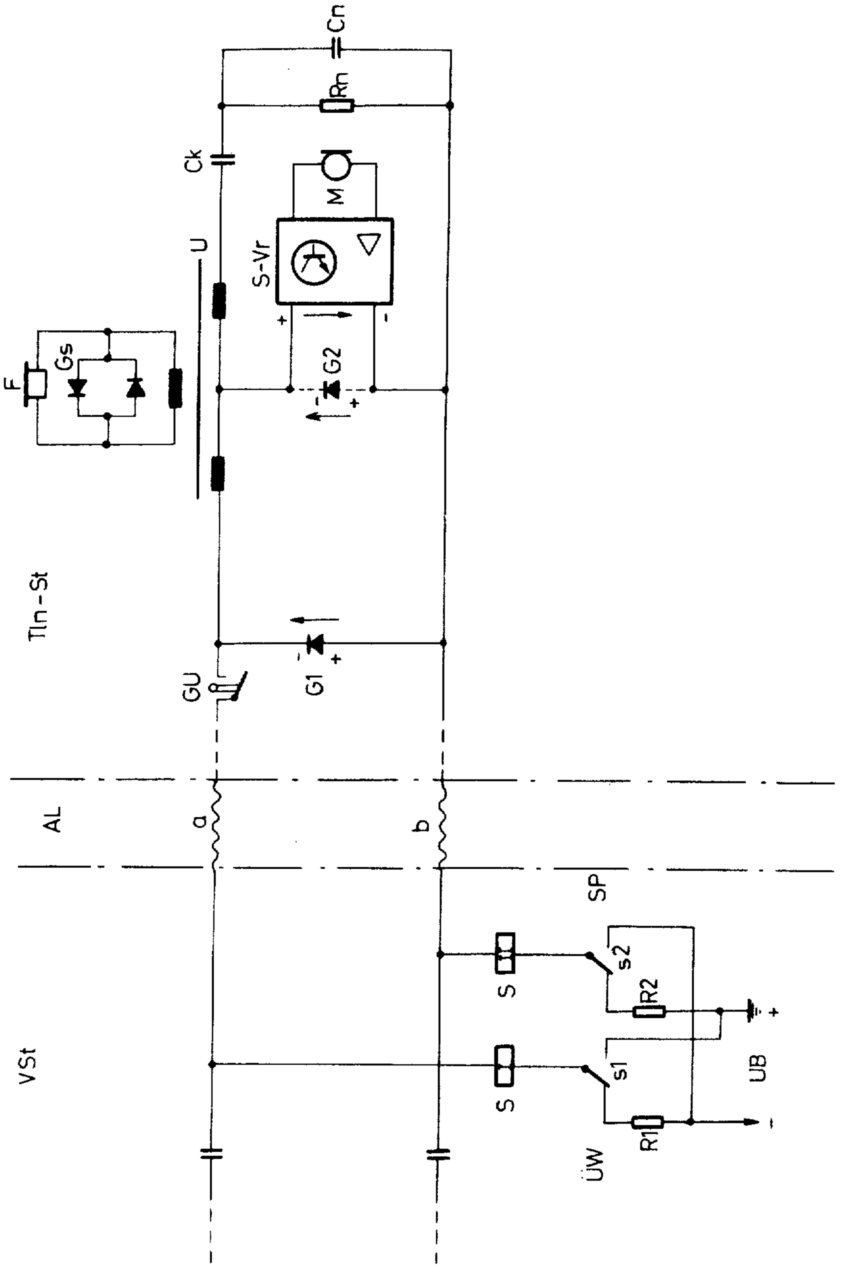
*INVENTOR*
HANS ULRICH KNAUER
BY Delbert P. Warner
*ATTORNEY*

ARRANGEMENT FOR THE RECOGNITION OF LOOP CLOSURE IN SUBSCRIBER STATIONS HAVING SEMICONDUCTOR AMPLIFIERS FED VIA THE CONNECTING TRUNK

This invention relates to a circuit arrangement for the recognition of call initiating loop closure in subscriber stations having semi-conductor amplifiers fed via the connecting trunk in telecommunications systems and particularly in telephone systems.

The feed circuits for the recognition of loop closure on lifting the hand set at a telephone subscriber station have very high resistance values, particularly in the case of subscriber stations in private branch exchange systems. To achieve sufficient coverage, and thus adequately long trunks, the d.c. resistance of the subscriber station must therefore be as low as possible. In normal subscriber stations the trunk is terminated by a low-resistance cradle circuit or hybrid, so that this condition may be easily fulfilled.

The present tendency is to include an increasing number of semi-conductor amplifiers in subscriber stations, which amplifiers are fed through the trunk. Speech and/or reception amplifiers are used, particularly for long trunks, in order to maintain the permissible transmission and/or reception reference equivalent. When these amplifiers are fed through the trunk the d.c. resistance of the amplifiers and thus that of the subscriber station as a whole increases. This increase in the d.c. resistance cannot be tolerated in the case of high-resistance feed circuits and long trunks, since a loop closure in the subscriber station through these trunk-fed amplifiers can no longer be clearly recognized. Thus, in spite of the use of amplifiers, the range of coverage must be reduced again due to non-recognition of loop closure.

It is an object of the invention to provide a circuit arrangement for the recognition of loop closure in subscriber stations having semi-conductor amplifiers fed via the connecting trunk, in telecommunication systems, particularly telephone systems, in which the range of coverage is not adversely affected by the use of amplifiers in the subscriber station and in which loop closure in the subscriber station may be clearly recognized in the case of high-resistance feed circuits and long connecting trunks.

The new circuit arrangement for the recognition of loop closure in subscriber stations having semi-conductor amplifiers fed via the connecting trunk, in telecommunication systems, particularly telephone systems, is characterized in that on the occurrence of loop closure in the subscriber station a virtual short circuit can be set for the direction of flow of the supervisory current. When this loop closure has been recognized in the exchange, the said short circuit can be set for the feed current flowing in the opposite direction and feeding the semi-conductor amplifiers in the subscriber station. The separation of the loop-closure criterion from the normal feed current direction permits optimum utilization of coverage, since the high-resistance feed resistance of the semi-conductor amplifiers is eliminated during supervision of the connecting trunk to determine loop closure in the subscriber station. After recognition of the loop closure the high-resistance subscriber station can be included in the oppositely directed feed current direction without deleterious results.

According to one form of the new arrangement the virtual short circuit for the supervisory current direction may be composed of a diode which connects the speech wires at the input of the subscriber station.

According to a further aspect of the invention the subscriber station may assume a low resistance for the supervisory current direction by short-circuiting the feed current inputs of the speech and/or reception amplifier by a diode which can be controlled so as to be conducting in the supervisory current direction.

It is of advantage for the design of the arrangement when the feed circuit in the exchange has a high resistance value in the supervisory current direction and a low resistance value in the feed current direction.

The invention is described below with reference to an embodiment illustrated in the drawing.

As may be seen from the drawing, in the quiescent state in the exchange VSt the feed voltage UB is applied to the wires *a,b* of the trunk AL such that the a-wire receives negative potential and the b-wire positive potential. The contacts s1 and s2 are in the position designated by UW, this corresponding to the position for supervision of the trunk to determine loop closure in the subscriber station Tln-St. The supervisory circuit also includes the resistors R1 and R2 of the feed circuit.

When the handset is lifted in the subscriber station T1n-St, the cradle switch contact GU is actuated and the supervisory circuit is short-circuited through the diode G1. The supervisory switching component S responds and its contacts s1 and s2 switch the feed circuit over to the feed current direction, as indicated by the position SP of these contacts. This switch-over eliminates the resistors R1 and R2 with the result that the feed circuit assumes a low resistance value. In the feed current direction the diode G1 becomes non-conducting and the speech amplifier S-Vr receives current.

The resulting d.c. resistance is determined by the resistance value of the feed circuit and the resistance value of the trunk AL. However, it no longer affects in any way the transmission of the loop closure criterion.

The transmission reference equivalent may be set by suitably adjusting the amplification of the speech amplifier S-Vr and/or suitably selecting a microphone M. The receiver F with its acoustic shock absorbing rectifier Gs is connected to the other four-wire side of the hybrid transformer U, while the balance side of the hybrid transformer is connected to the balancing elements Cn and Rn via the capacitor Ck, which may be omitted if necessary.

As is also indicated, the subscriber station may also assume a low resistance value by means of a diode short-circuiting the feed inputs of the speech amplifier S-Vr. When the direction of current flow is reversed, this diode G2 is also non-conducting. If a reception amplifier is provided, its feed inputs will also be coupled to the wires *a,b* of the trunk AL and may be similarly short-circuited by a diode which can be controlled so as to be conducting in the supervisory current direction.

As the present simple embodiment shows, the arrangement of the invention may thus be designed with reference to the loop-closure criterion and the feed of the subscriber station amplifiers independently of each other.

While the principles of the invention have been described above in connection with specific apparatus and applications, it is to be understood that this description is made only by way of example and not as a limitation on the scope of the invention.

I claim:

1. A circuit arrangement for the recognition of call-initiating loop closure in telecommunication systems having subscriber stations which include a semi-conductor speech amplifier fed via a connecting trunk to a central exchange, the circuit arrangement comprising a diode element shunting the subscriber line at the input of the subscriber station so as to virtually short circuit the supervisory circuit means in the central exchange in a first direction of current flow in response to call-initiating loop closure of the subscriber loop, and supervisory circuit means, at the system exchange, responsive to the flow of current in said first direction, for causing the current to flow in the opposite direction in the loop and to energize thereby the semi-conductor amplifier at the subscriber station, said supervisory circuit means including a feed circuit and a pair of contacts, one of which is in each of the speech lines of the trunk coupling the feed circuit to the subscriber station.

2. A circuit arrangement as claimed in claim 1, in which the feed circuit in the exchange includes means for providing a high resistance value in said supervisory current direction.

3. A circuit arrangement as claimed in claim 2, in which the feed circuit in the exchange further includes means for providing a low resistance value in said opposite direction of current flow.

4. A circuit arrangement for the recognition of call-initiating loop closure in telecommunication systems having subscriber stations which include, a semi-conductor speech amplifier fed via a connecting trunk to the central exchange, the circuit arrangement comprising a diode element shunting the subscriber station speech amplifier at the input terminals thereof so as to virtually short circuit the supervisory circuit means in the central exchange in a first direction of current flow in response to the call-initiating loop closure of the subscriber loop, and supervisory circuit means, at the system exchange, responsive to the flow of current in said first direction, for causing the current to flow in the opposite direction in the loop and to energize thereby the semiconductor amplifier at the subscriber station, said supervisory circuit means including a feed circuit and a pair of contacts, one of which is in each of the speech lines of the trunk coupling the feed circuit to the subscriber station.

5. A circuit arrangement as claimed in claim 4, in which the feed circuit in the exchange includes means for providing a high resistance value in said supervisory current direction.

6. A circuit arrangement as claimed in claim 5, in which the feed circuit in the exchange further includes means for providing a low resistance value in said opposite (feed current) direction of current flow.

* * * * *